(12) United States Patent
Mak et al.

(10) Patent No.: US 12,306,528 B2
(45) Date of Patent: May 20, 2025

(54) MAGNET ARRANGEMENT STRUCTURE SUITABLE FOR VOICE COIL MOTOR AND MICRO GIMBAL STABILIZER

(71) Applicant: Vista Innotech Limited, Hong Kong (CN)

(72) Inventors: Lin Chi Mak, Hong Kong (CN); Yee Chung Chu, Hong Kong (CN)

(73) Assignee: VISTA INNOTECH LIMITED, Hong Kong (CN)

( * ) Notice: Subject to any disclaimer, the term of this patent is extended or adjusted under 35 U.S.C. 154(b) by 492 days.

(21) Appl. No.: 17/743,373

(22) Filed: May 12, 2022

(65) Prior Publication Data

US 2023/0048052 A1 Feb. 16, 2023

(30) Foreign Application Priority Data

Aug. 16, 2021 (CN) ........................ 2021109389405.5

(51) Int. Cl.
  *G03B 5/06* (2021.01)
  *H02K 41/035* (2006.01)
  *G02B 27/64* (2006.01)

(52) U.S. Cl.
  CPC ............ *G03B 5/06* (2013.01); *H02K 41/0354* (2013.01); *G02B 27/64* (2013.01); *G03B 2205/0069* (2013.01)

(58) Field of Classification Search
  CPC ...... G02B 27/64; G02B 27/646; H04N 23/68; H04N 23/682; H04N 23/685; H04N 23/687; H04N 23/57
  USPC ....... 359/557, 554; 250/201.1, 201.2, 201.4; 348/208.99, 208.2, 208.12; 396/52, 55
  See application file for complete search history.

(56) References Cited

U.S. PATENT DOCUMENTS

| 10,170,971 | B1 | 1/2019 | Yeakley et al. |
| 2015/0160470 | A1* | 6/2015 | Terajima ............ G02B 27/646 |
| | | | 359/557 |
| 2019/0006931 | A1 | 1/2019 | Yeakley et al. |

FOREIGN PATENT DOCUMENTS

| JP | 2013097028 A | * | 5/2013 |
| WO | WO-2023019955 A1 | * | 2/2023 ............... G03B 5/06 |

* cited by examiner

*Primary Examiner* — Arnel C Lavarias
(74) *Attorney, Agent, or Firm* — MUNCY, GEISSLER, OLDS & LOWE, P.C.

(57) ABSTRACT

A magnet arrangement structure suitable for a voice coil motor includes a magnet holder and a coil holder coaxial with the magnet holder. 2n groups of magnets are provided on the magnet holder, each group of magnets is symmetrically provided around a central axis of the magnet holder, each group of magnets includes at least one magnet, and each magnet has two magnetic poles; the surfaces facing the central axis of each group of magnets include two different magnetic poles, and each magnetic pole is opposite to the magnetic pole; and each group of magnets also corresponds to a coil. Compared with the traditional art, the magnetic field intensity passing through the coil can be improved, power consumption is reduced, electromagnetic force is increased, and the benefits of reducing weight, cost and size of the motor are achieved.

13 Claims, 10 Drawing Sheets

A-A

B-B

C-C

E–E

MAGNET ARRANGEMENT STRUCTURE SUITABLE FOR VOICE COIL MOTOR AND MICRO GIMBAL STABILIZER

FIELD OF TECHNOLOGY

The present invention relates to the field of voice coil motors, and particularly to a magnet arrangement structure suitable for a voice coil motor, and a micro gimbal stabilizer.

BACKGROUND

The voice coil motor is a motor for pushing a rotor in the voice coil motor by converting a current into force, thus achieving at least one-axis translation or rotational motion. The traditional voice coil structure generally comprises a stator, a rotor, a magnet, and a coil. The stator is fixed, while the rotor is connected to the stator through a spring or a ball. The magnet and the coil are provided in opposite, which are respectively located at the stator and the rotor, or at the rotor and the stator. The force applied to the rotor can be changed by changing the current in the coil, thus pushing the rotor to perform at least one-axis translation or rotational precision motion.

The voice coil motor requires a higher current to counteract the gravity and inertia of the rotor, as well as the spring force or ball friction during motion and when maintaining the position, resulting in higher power consumption. To reduce the power consumption and increase the electromagnetic force, the magnet and coil in the voice coil motor may need to be larger, which may lead to a rise in weight, cost, and volume of the voice coil motor. In addition, as the multi-axis voice coil requires a more complex structure and a plurality of currents, the multi-axis voice coil is higher in power consumption, weight, cost and volume than a one-axis voice coil motor, resulting in a more serious problem.

SUMMARY

For above problem, a magnet arrangement structure suitable for a voice coil motor is provided by the present invention to change a layout of magnets, which can reduce the power consumption of the motor, increase the electromagnetic force, and is conducive to reducing the weight, cost and volume of the motor.

The technical solution adopted by the present invention is as follows:

A magnet arrangement structure suitable for a voice coil motor comprises a magnet holder and a coil holder coaxial with the magnet holder, wherein 2n magnet groups are provided on the magnet holder, n is a natural number and is greater than or equal to 1, each magnet group is symmetrically provided around a central axis of the magnet holder, each magnet group comprises at least one magnet, and each magnet has two magnetic poles; surfaces, facing the central axis, of each magnet group comprise two different magnetic poles, and each magnetic pole is opposite to the magnetic pole of the adjacent magnet group; and each magnet group also corresponds to a coil, and the coil is installed on the coil holder.

Preferably, the coil holder is nested in the magnet holder, the coil holder is coaxial with the magnet holder, the magnet is provided on an inner wall of the magnet holder, and the coil is installed on an outer wall of the coil holder; an upper positioning holder is further provided in the magnet holder, the upper positioning holder is located above the coil holder, the bottom of the magnet holder is provided with a lower positioning holder in fit with the upper positioning holder, and the upper positioning holder and the lower positioning holder are both coaxial with the magnet holder.

More preferably, the magnet holder and the magnet are located on a stator of the voice coil motor, the coil holder and the coil are located on a movable rotor, and the stator is connected to the rotor through a spring or a ball.

Preferably, the coil holder is nested outside the magnet holder, the coil holder is coaxial with the magnet holder, the coil is installed on an inner wall of the coil holder, and the magnet is provided on an outer wall of the magnetic holder; the coil holder is further nested in the upper positioning holder coaxial with the magnet holder, and the bottom of the magnet holder is provided with the lower positioning holder in fit with the upper positioning holder.

More preferably, the coil holder and the coil are located on the fixed stator in the voice coil motor, the magnet holder and the magnet are located on the movable rotor in the voice coil motor, and the stator is connected to the rotor through a spring or a ball.

Preferably, two magnet groups are further provided in the magnet holder, the two magnet groups respectively correspond to two coils, and the two magnet groups are symmetrically provided by rotating 180 degrees around the central axis.

Preferably, four magnet groups are further provided in the magnet holder, the four magnet groups respectively correspond to four coils, and the four magnet groups are symmetrically provided by rotating 90 degrees around the central axis.

Preferably, eight magnet groups are further provided in the magnet holder, the eight magnet groups respectively correspond to eight coils, and the eight magnet groups are symmetrically provided by rotating 45 degrees around the central axis.

A micro gimbal stabilizer, comprising a camera module and a voice coil motor, wherein the micro gimbal stabilizer further comprises a magnet arrangement structure provided in the voice coil motor, and the camera module is provided on a rotor of the voice coil motor.

Preferably, the magnet arrangement structure comprises a magnet holder, four magnet groups are provided on the magnet holder, each magnet group comprises an upper magnet and a lower magnet, magnetic poles, facing a central axis, of the upper magnet and the lower magnet are opposite, and the magnetic poles of two adjacent magnet groups are opposite; each magnet group also corresponds to a coil, and the coil is installed on a coil holder coaxial with the magnet holder; the magnet holder and the magnet are provided on the stator of the voice coil motor, and the coil holder, the coil and the camera module are provided on a rotor of the voice coil motor; the camera module comprises at least one lens and at least one image sensor, the lens is located in the coil holder in the rotor of the voice coil motor, and the image sensor is provided below the coil holder.

Compared with the prior art, the present invention has the beneficial effects as follows: in accordance with a magnet arrangement structure suitable for a voice coil motor provided by the present invention, at least two magnet groups are provided on a magnet holder, each magnet group comprises at least two surfaces facing the central axis and opposite in polarity, the polarity of each magnet facing the central axis is opposite to that of the adjacent magnet, and the magnet in each magnet group is provided opposite to the coil, so that the magnetic field intensity passing through the coil can be effectively improved, power consumption is reduced, electromagnetic force is increased, and the benefits of reducing weight, cost and volume of the motor are achieved. Moreover, the magnet arrangement structure is suitable for a part of existing voice coil motors, there is no need to modify the voice coil motor significantly, only the magnet arrangement and a magnetization direction need to be changed, thus reducing the cost of upgrading the motor.

DESCRIPTION OF THE EMBODIMENTS

Figure 1:
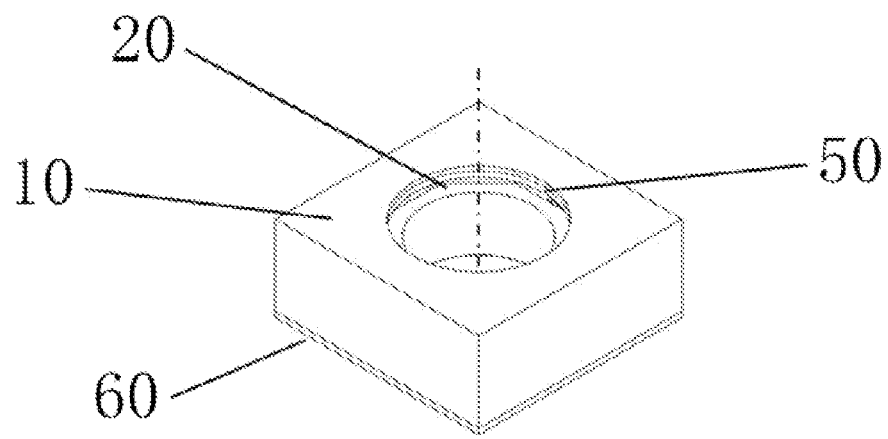
FIG. 1 is a diagram of an embodiment I of a magnet arrangement structure suitable for a voice coil motor in accordance with the present invention.
Figure 2:
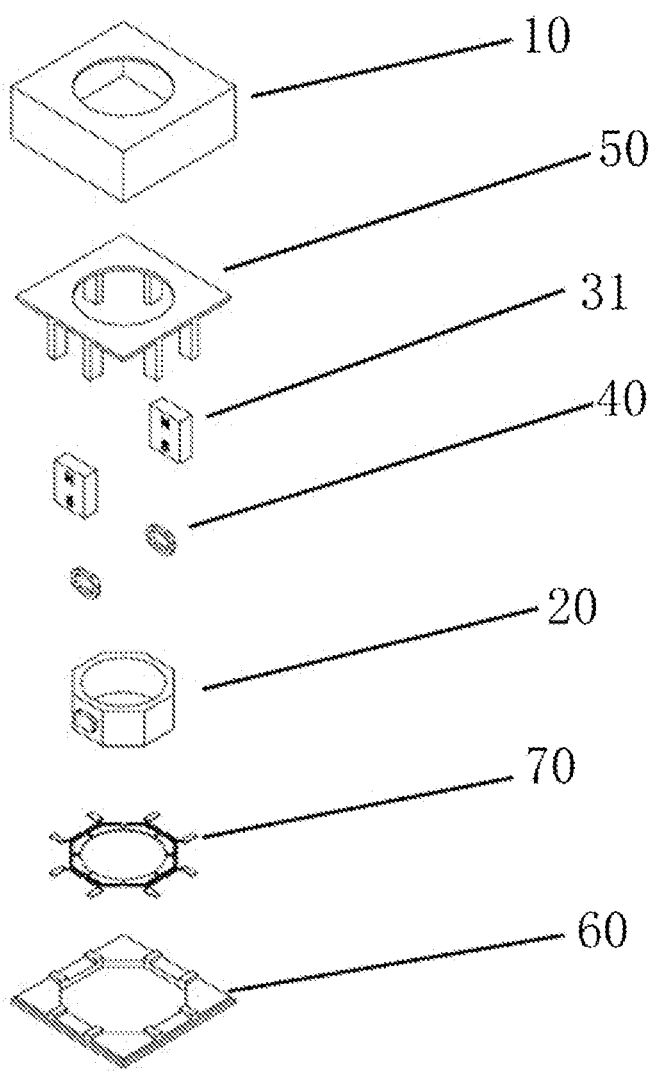
FIG. 2 is an exploded view of an embodiment I of a magnet arrangement structure suitable for a voice coil motor in accordance with the present invention.
Figure 3:
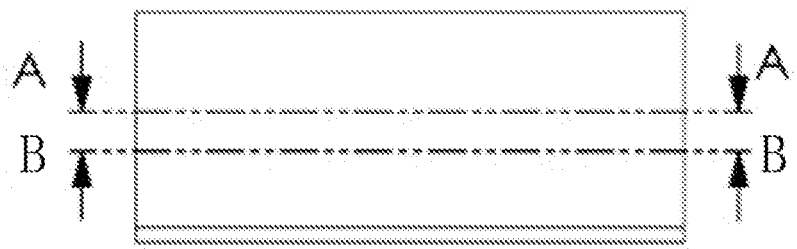
FIG. 3 is a side view of an embodiment I of a magnet arrangement structure suitable for a voice coil motor in accordance with the present invention.
Figure 4:
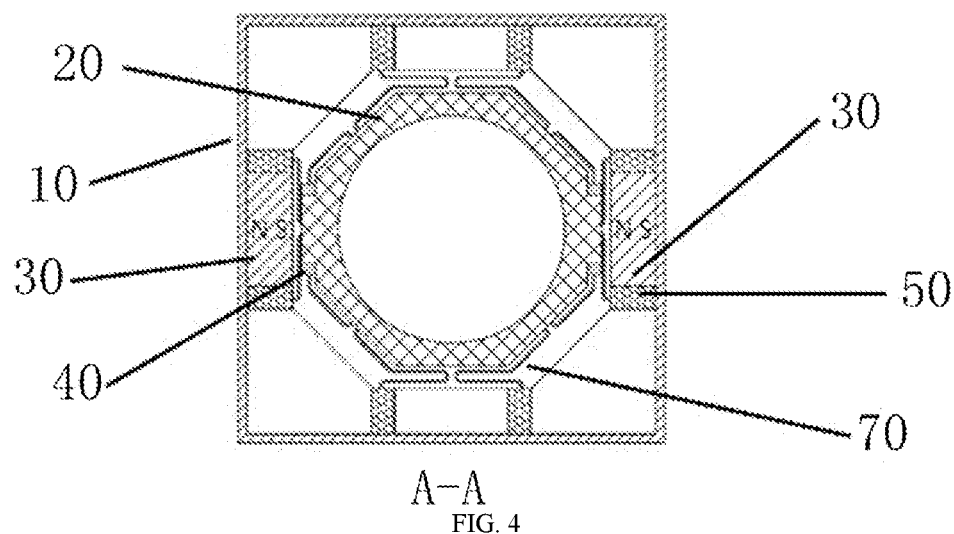
FIG. 4 is a sectional view A-A of an embodiment I of a magnet arrangement structure suitable for a voice coil motor in accordance with the present invention.
Figure 5:
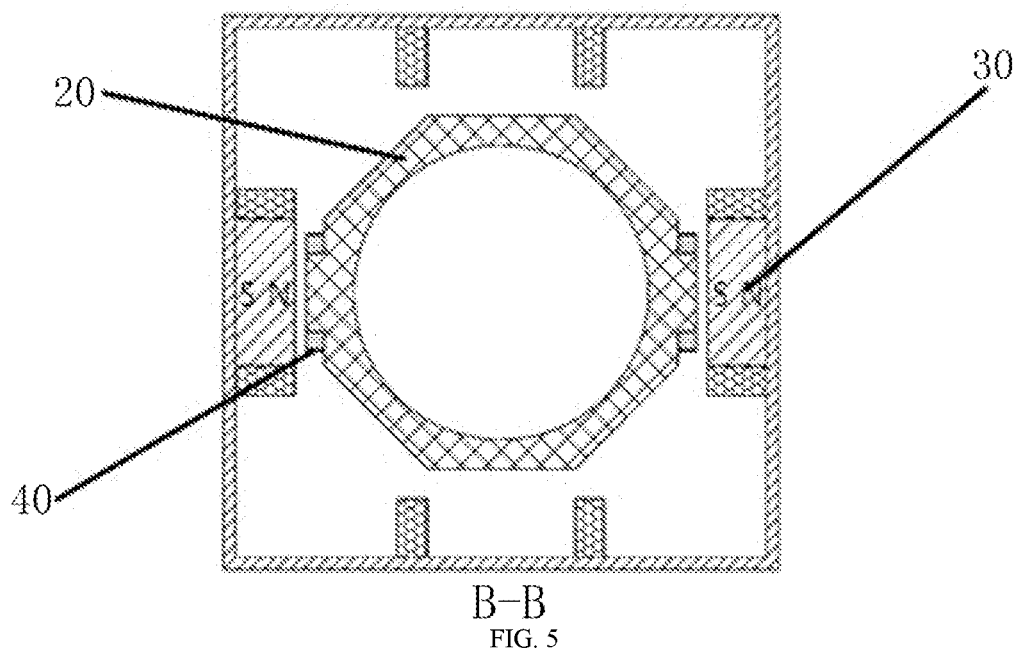
FIG. 5 is a sectional view B-B of an embodiment I of a magnet arrangement structure suitable for a voice coil motor in accordance with the present invention.
Figure 6:
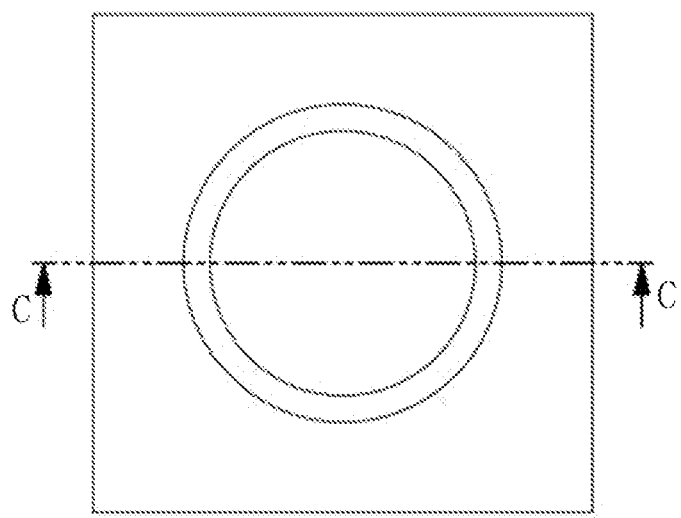
FIG. 6 is a top view of an embodiment I of a magnet arrangement structure suitable for a voice coil motor in accordance with the present invention.
Figure 7:
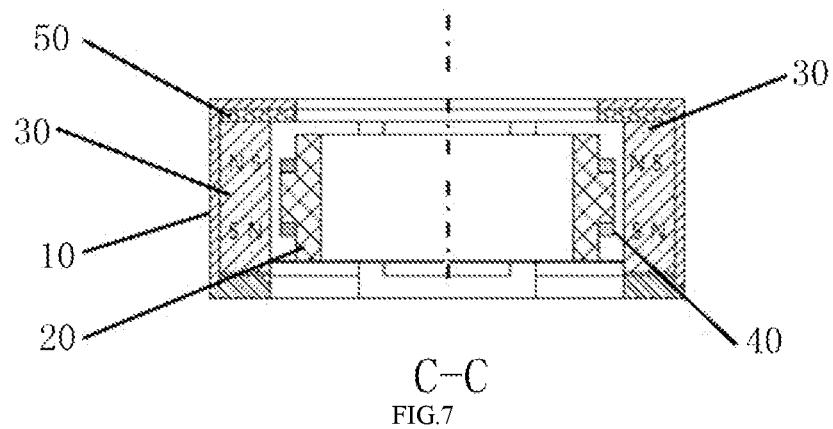
FIG. 7 is a sectional view C-C of an embodiment I of a magnet arrangement structure suitable for a voice coil motor in accordance with the present invention.

The preferred embodiments provided by the present invention are described in detail according to the accompanying drawings.

FIG. 1 to FIG. 15 are preferred embodiments of a magnet arrangement structure suitable for a voice coil motor provided by the present invention. As shown in FIG. 1 to FIG. 15, the magnet arrangement structure suitable for the voice coil motor comprises a magnet holder 10 and a coil holder 20 coaxial with the magnet holder, 2n magnet groups 30 are provided on the magnet holder 10, n is a natural number and is greater than or equal to 1, each magnet group 30 is symmetrically provided around a central axis of the magnet holder 10, each magnet group 30 comprises at least one magnet 31, and each magnet 31 has two magnetic poles; surfaces, facing the central axis, of each magnet group comprise two different magnetic poles, and each magnetic pole is opposite to the magnetic pole of the adjacent magnet group 30; and each magnet group 30 also corresponds to a coil 40, and the coil 40 is installed on the coil holder 20; each magnet 31 is provided with a N pole and an S pole, that is, the surfaces, facing the central axis, in each magnet group 30 comprise the N pole (North pole) and the S pole (South pole), and magnetic pole arrangement in two adjacent magnet groups are opposite, the magnet and the coil are provided in opposite, so that the magnetic field intensity passing through the coil can be effectively improved, power consumption is reduced, electromagnetic force is increased, and the benefits of reducing weight, cost and volume of the motor are achieved. Moreover, the magnet arrangement structure is suitable for a part of existing voice coil motors, there is no need to modify the voice coil motor significantly, only the magnet arrangement and a magnetization direction need to be changed, thus reducing the cost of upgrading the motor.

FIG. 1 to FIG. 8 show a first embodiment of the magnet arrangement structure suitable for the voice coil motor. In this embodiment, two magnet groups 30 are provided on the magnet holder 10, and positions and shapes of the two magnet groups are symmetric by rotating 180 degrees around the central axis; the coil holder 20 is nested in the magnet holder 10, the coil holder 20 is coaxial with the magnet holder 10, the magnet 31 is provided on an inner wall of the magnet holder 10, the coil 40 is installed on an outer wall of the coil holder 20, and the magnet 31 and the coil 40 are provided in opposite; an upper positioning holder 50 is further provided in the magnet holder 10, and the upper positioning holder 50 is located above the coil holder 20; the bottom of the magnet holder 10 is provided with a lower positioning holder 60 in fit with the upper positioning holder 50, the upper positioning holder 50 and the lower positioning holder 60 are both coaxial with the magnet holder 10, and the upper positioning holder 50 and the lower positioning holder 60 can play a role of positioning the magnet 31.

The magnet holder 10 and the magnets 31 are located on a stator of the voice coil motor, the coil holder 20 and the coils 40 are located on a movable rotor, the stator is connected to the rotor through a spring 70 or a ball, and a magnetic field between the magnets 31 is approximately parallel to an electromagnetic force direction generated by the coil and the central axis of the magnet holder, generally at an included angle of less than 20 degrees. The upper positioning holder 50 and the lower positioning holder 60 can play a role in positioning the spring 70.

Figure 8:
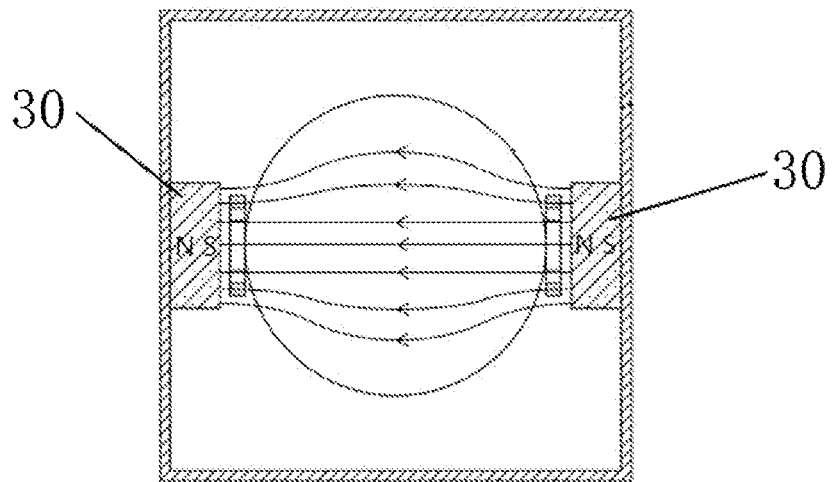
FIG. 8 is a diagram of a magnetic field line of an embodiment I of a magnet arrangement structure suitable for a voice coil motor in accordance with the present invention.

Each magnet group comprises a magnet 31, the magnet 31 is provided with a N pole and an S pole, and each magnetic pole is opposite to the magnetic pole of the adjacent magnet group; for example, the magnetic pole, facing the central axis, at the upper side of one magnet 31 is the S pole, and the magnetic pole, facing the central axis, at the lower side of the magnet is the N pole; and the magnetic pole, facing the central axis, at the upper side of the other adjacent magnet is the N pole, and the magnetic pole, facing the central axis, at the lower side of the other adjacent magnet is the S pole. It needs to be noted that, due to the fact that the adjacent magnetic pole facing the central axis are opposite, the magnetic field can pass through the coil more intensively to increase the magnetic field intensity of the coil, so that the electromagnetic force is improved and the motor power consumption is reduced. As shown in FIG. 8, leftward magnetic fields can be provided by the top sides of the two magnet groups to the top sides of all the two coils, so that the influence of the two magnet groups on the magnetic field is added, and the magnetic field intensity passing through the coil can be increased.

Figure 9:
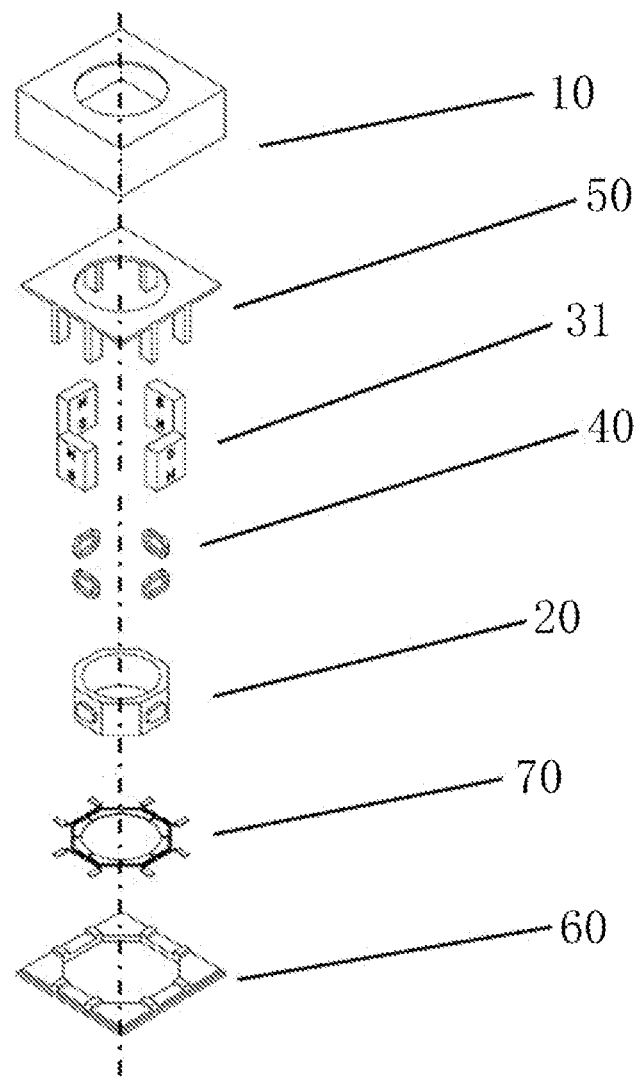
FIG. 9 is an exploded view of an embodiment II of a magnet arrangement structure suitable for a voice coil motor in accordance with the present invention.
Figure 10:
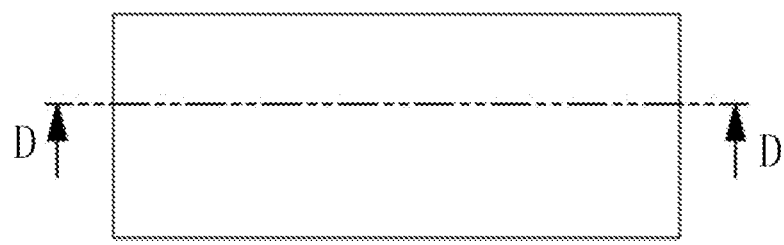
FIG. 10 is a side view of an embodiment II of a magnet arrangement structure suitable for a voice coil motor in accordance with the present invention.
Figure 11:
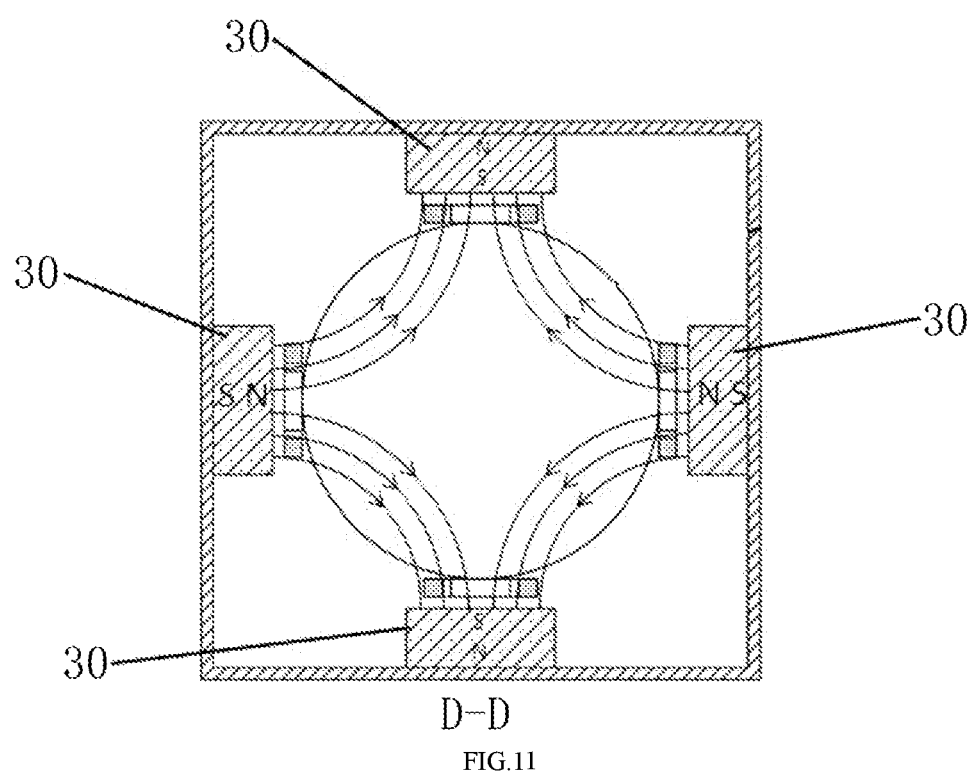
FIG. 11 is a sectional view D-D of an embodiment II of a magnet arrangement structure suitable for a voice coil motor in accordance with the present invention.

FIG. 9 to FIG. 11 show a second embodiment of a magnetic arrangement structure suitable for a voice coil motor. The second embodiment is similar in structure to the first embodiment. In the second embodiment, the magnet arrangement structure comprises four magnet groups and four coils; each magnet group 30 comprises one magnet 31, the magnet 31 is provided with a N pole and an S pole, positions and shapes of the four magnet groups 30 are symmetrically provided by rotating 90 degrees around the central axis, each magnet group 30 corresponds to a coil 40, and each magnet 31 is vertically provided.

In the second embodiment, the magnetic poles of each magnet group 30 are opposite to the magnetic poles of the adjacent magnet group; for example, the magnetic pole, facing the central axis, at the upper side of one magnet group is the N pole, and the magnetic pole, facing the central axis, at the lower side of one magnet group is the S pole; and the magnetic poles, facing the central axis, at the upper sides of two adjacent magnet groups are both S poles, and the magnetic poles, facing the central axis, at the lower sides of two adjacent magnet groups are both N poles. As the adjacent magnet poles facing the central axis in the second embodiment are opposite, the magnetic field can pass through the coil more intensively, the magnetic field intensity passing through the coil is increased, the electromagnetic force is improved, and the power consumption of the motor is reduced.

Figure 12:
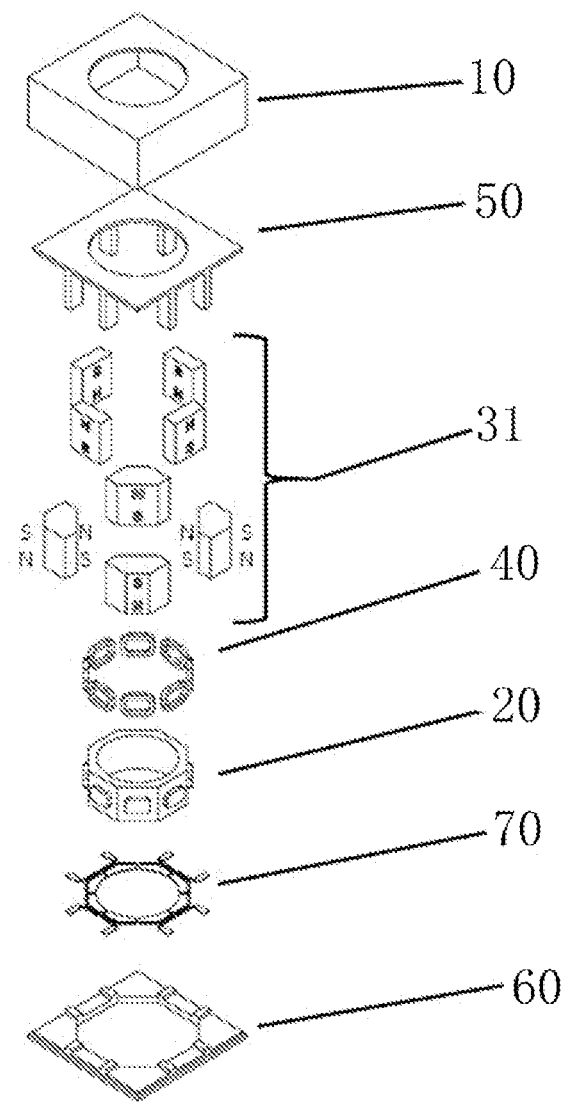
FIG. 12 is an exploded view of an embodiment III of a magnet arrangement structure suitable for a voice coil motor in accordance with the present invention.

FIG. 12 shows a third embodiment of a magnet arrangement structure suitable for the voice coil motor. The third embodiment is similar in structure to the first embodiment. In the third embodiment, the magnet arrangement structure comprises eight magnet groups and eight coils, each magnet group 30 comprises one magnet 31, the magnet 31 is provided with a N pole and an S pole, positions and shapes of the eight magnet groups 30 are symmetrically provided by rotating 45 degrees around the central axis, each magnet group 30 corresponds to a coil 40, each magnet 31 is vertically provided, and the magnetic poles of each magnet group 30 are opposite to the magnetic poles of the adjacent magnet group.

Figure 13:
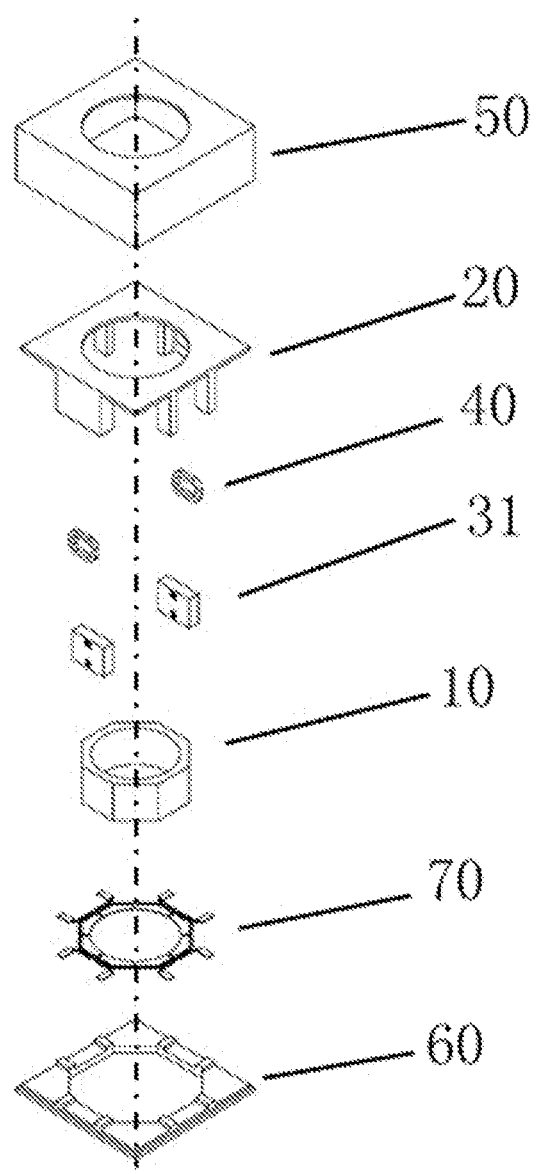
FIG. 13 is an exploded view of an embodiment IV of a magnet arrangement structure suitable for a voice coil motor in accordance with the present invention.
Figure 14:
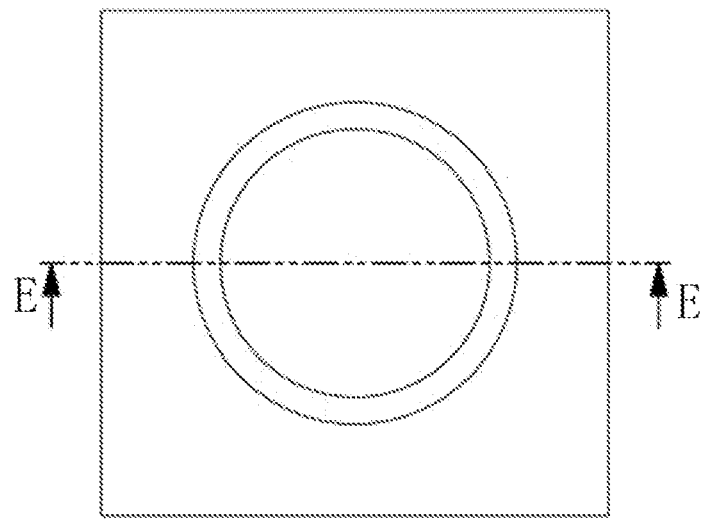
FIG. 14 is a top view of an embodiment IV of a magnet arrangement structure suitable for a voice coil motor in accordance with the present invention.
Figure 15:
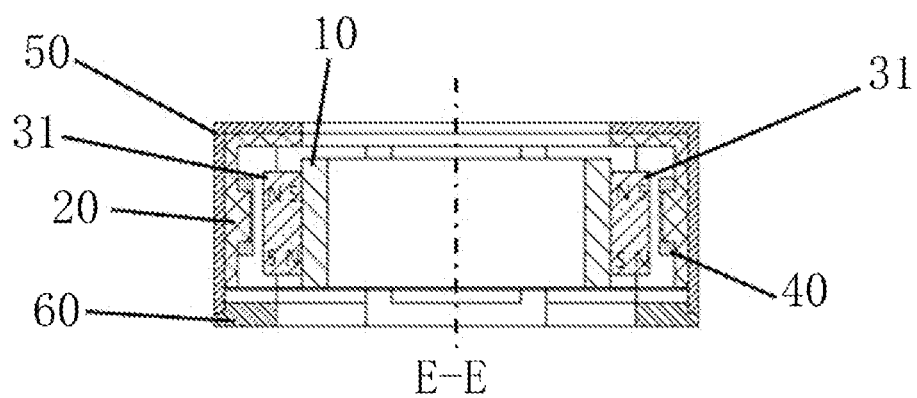
FIG. 15 is a sectional view E-E of an embodiment IV of a magnet arrangement structure suitable for a voice coil motor in accordance with the present invention.

FIG. 13 to FIG. 15 show a fourth embodiment of the magnet arrangement structure suitable for the voice coil motor, and the fourth embodiment is similar in structure to the first embodiment. In the fourth embodiment, the coil holder 20 is nested outside the magnet holder 10, the coil holder 20 is coaxial with the magnet holder 10, the coil 40 is installed on an inner wall of the coil holder 20, and the magnet 31 is provided on an outer wall of the magnet holder 10; the coil holder 20 is nested in an upper positioning holder 50 coaxial with the magnet holder, the bottom of the magnet holder 10 is provided with a lower positioning holder 60 in fit with the upper positioning holder; the coil holder 20 and the coil 40 are located on a fixed stator in the voice coil motor, the magnet holder 10 and the magnet 31 are located on a movable rotor in the voice coil motor, and the stator is connected to the rotor through a spring 70 or a ball.

It is worth noting that in each of the above embodiments, the magnet holder 10 is composed of a magnetic-conductive material, such as steel, by using a magnetic-conductive magnet holder, the magnetic field passing through the coil can be increased, an attractive force between the magnet and the magnet holder is increased, the probability that the magnets fly off during falling is reduced, and the falling reliability is improved; each magnet group can also comprise two magnets, and the two magnets are provided side by side.

When the magnet arrangement structure is provided in the voice coil motor, at least one lens is provided at the center of the voice coil motor; the lens can be driven to perform at least one-axis motion by changing a current passing through at least one coil in the magnet arrangement structure, and the at least one-axis motion can achieve the functions of auto-focusing or/and multi-axis stabilization.

Figure 16:
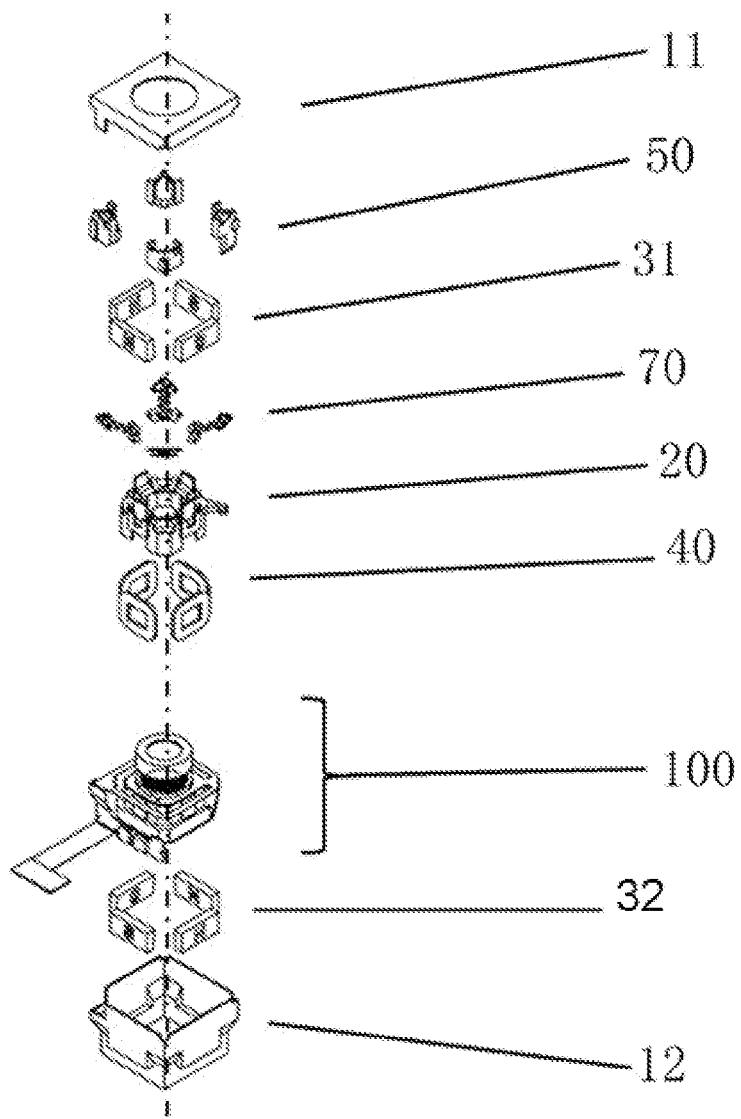
FIG. 16 is an exploded view of a micro gimbal stabilizer in accordance with the present invention.
Figure 17:
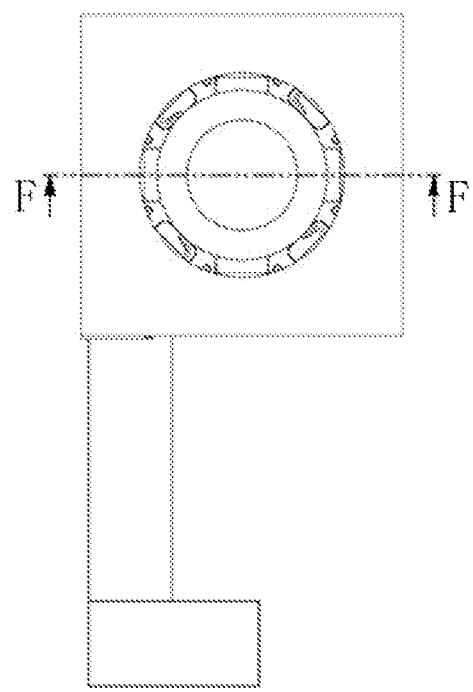
FIG. 17 is a top view of a micro gimbal stabilizer in accordance with the present invention.
Figure 18:
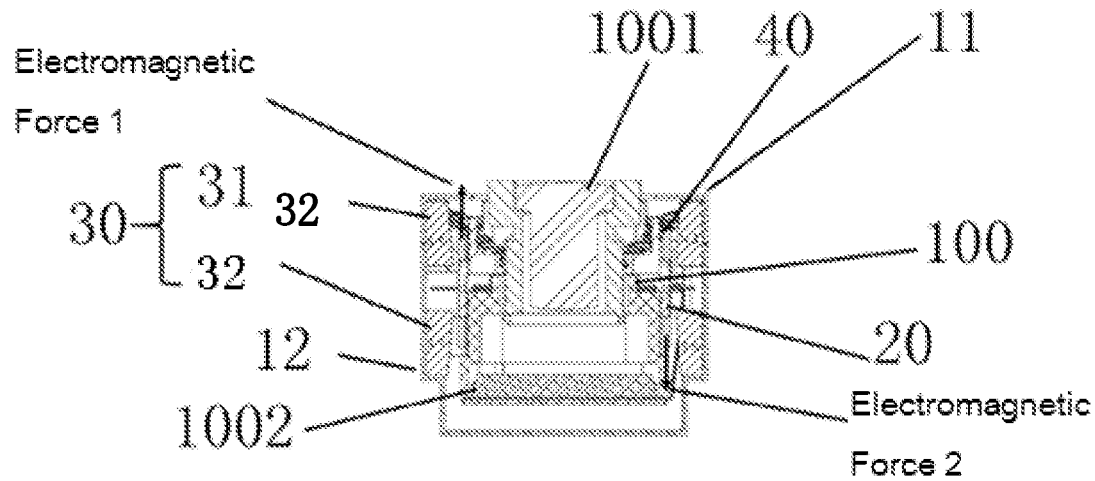
FIG. 18 is a sectional view F-F of a micro gimbal stabilizer in accordance with the present invention.

As shown in FIG. 16 to FIG. 18, a micro gimbal stabilizer is further provided by the present invention, comprising a camera module 100 and a voice coil motor, and further comprising a magnet arrangement structure provided in the voice coil motor, wherein the camera module is provided on a rotor of the voice coil motor. The magnet arrangement structure is applied in the micro gimbal stabilizer, a magnetic field line can pass through the coil more intensively, the magnetic field intensity passing through the coil is increased, the electromagnetic force is improved, and the power consumption of the motor is reduced; the lens in the camera module can be driven to perform at least one-axis motion by changing the current passing through at least one coil in the magnet arrangement structure, thus achieving the functions of auto-focusing or/and multi-axis stabilization.

As a preferred embodiment, the magnet arrangement structure comprises a magnet holder 10, four magnet groups 30 are provided on the magnet holder 10, each magnet group 30 comprises an upper magnet 31 and a lower magnet 32, and magnetic poles, facing the central axis, of the upper magnet 31 and the lower magnet 32 are opposite, the magnetic poles of the four adjacent magnets 31 are opposite, each magnet group further corresponds to a coil 40, and the coil 40 is installed on the coil holder 20 coaxial with the magnet holder 10; the magnet holder 10 and the magnet 31 are provided on the stator of the voice coil motor, the coil holder 20, the coils 40 and the camera module 100 are provided on a rotor of the voice coil motor; the camera module 100 comprises at least one lens 1001 and at least one image sensor 1002, the lens 1001 is located in the coil holder 20 in the rotor of the voice coil motor, and the image sensor 1002 is provided below the coil holder 20. The magnet holder 10 is divided into an upper magnet holder 11 and a lower magnet holder 12, the upper magnet holder 11 is coaxial with the lower magnet holder 12, the upper magnet 31 is provided on the upper magnet holder 11, and the lower magnet 32 is provided on the lower magnet holder 12. With varying current directions and intensities through the coil 40, different magnetic forces can be generated, such as, an upward electromagnetic force 1 and a downward electromagnetic force 2 in FIG. 18. The electromagnetic force can drive the camera module 100 in the rotor to tilt for image stabilization.

As above, the purpose of the present invention can be fully and effectively achieved through the technical solution, the structure and function principles of the present invention have been fully verified in the embodiments, thus achieving the expected effects and purposes. Various changes or modifications can be made to the embodiments of the present invention without departing from the principle and essence of the present invention. Therefore, the present invention includes all substitutions within the scope of the patent application, and any equivalent changes made within the scope of the patent application for the present invention are within the scope of the patent application in this case.

The invention claimed is:

1. A micro gimbal stabilizer, comprising a camera module and a voice coil motor, wherein the micro gimbal stabilizer further comprises a magnet arrangement structure provided in the voice coil motor, and the camera module is provided on a rotor of the voice coil motor, wherein the magnet arrangement structure suitable, comprising:
a magnet holder, and
a coil holder coaxial with the magnet holder,
wherein 2n magnet groups are provided on the magnet holder, n is a natural number and is greater than or equal to 1, each magnet group is symmetrically provided around a central axis of the magnet holder, each magnet group comprises at least one magnet, and each magnet has two magnetic poles; surfaces, facing the central axis, of each magnet group comprise two different magnetic poles, and each magnetic pole is opposite to the magnetic pole of an adjacent magnet group; and each magnet group also corresponds to a coil, and the coil is installed on the coil holder.

2. The micro gimbal stabilizer according to claim 1, wherein the coil holder is nested in the magnet holder, the coil holder is coaxial with the magnet holder, the magnet is provided on an inner wall of the magnet holder, and the coil is installed on an outer wall of the coil holder; an upper positioning holder is further provided in the magnet holder, the upper positioning holder is located above the coil holder, the bottom of the magnet holder is provided with a lower positioning holder in fit with the upper positioning holder, and the upper positioning holder and the lower positioning holder are both coaxial with the magnet holder.

3. The micro gimbal stabilizer according to claim 2, wherein the magnet holder and the magnet are located on a stator of the voice coil motor, the coil holder and the coil are located on a movable rotor, and the stator is connected to the rotor through a spring or a ball.

4. The micro gimbal stabilizer according to claim 1, wherein the coil holder is nested outside the magnet holder, the coil holder is coaxial with the magnet holder, the coil is installed on an inner wall of the coil holder, and the magnet is provided on an outer wall of the magnetic holder; the coil holder is further nested in the upper positioning holder coaxial with the magnet holder, and the bottom of the magnet holder is provided with the lower positioning holder in fit with the upper positioning holder.

5. The micro gimbal stabilizer according to claim 4, wherein the coil holder and the coil are located on the fixed stator in the voice coil motor, the magnet holder and the magnet are located on the movable rotor in the voice coil motor, and the stator is connected to the rotor through a spring or a ball.

6. The micro gimbal stabilizer according to claim 1, wherein two magnet groups are further provided in the magnet holder, the two magnet groups respectively correspond to two coils, and the two magnet groups are provided with 180-degree rotation symmetry around the central axis.

7. The micro gimbal stabilizer according to claim 1, wherein four magnet groups are further provided in the magnet holder, the four magnet groups respectively correspond to four coils, and the four magnet groups are provided with 90-degree rotation symmetry around the central axis.

8. The micro gimbal stabilizer according to claim 1, wherein eight magnet groups are further provided in the magnet holder, the eight magnet groups respectively correspond to eight coils, and the eight magnet groups are provided with 45-degree rotation symmetry around the central axis.

9. The micro gimbal stabilizer according to claim 1, wherein the magnet arrangement structure comprises a magnet holder, four magnet groups are provided on the magnet holder, each magnet group comprises an upper magnet and a lower magnet, magnetic poles, facing a central axis, of the upper magnet and the lower magnet are opposite, and the magnetic poles of two adjacent magnet groups are opposite; each magnet group also corresponds to a coil, and the coil is installed on a coil holder coaxial with the magnet holder; the magnet holder and the magnet are provided on the stator of the voice coil motor, and the coil holder, the coil and the camera module are provided on a rotor of the voice coil motor; the camera module comprises at least one lens and at least one image sensor, the lens is located in the coil holder in the rotor of the voice coil motor, and the image sensor is provided below the coil holder.

10. A magnet arrangement structure suitable for a voice coil motor, comprising a magnet holder and a coil holder coaxial with the magnet holder, wherein 2n magnet groups are provided on the magnet holder, n is a natural number and is greater than or equal to 1, each magnet group is symmetrically provided around a central axis of the magnet holder, each magnet group comprises at least one magnet, and each magnet has two magnetic poles; surfaces, facing the central axis, of each magnet group comprise two different magnetic poles, and each magnetic pole is opposite to the magnetic pole of an adjacent magnet group; and each magnet group also corresponds to a coil, and the coil is installed on the coil holder;
wherein the coil holder is nested outside the magnet holder, the coil holder is coaxial with the magnet holder, the coil is installed on an inner wall of the coil holder, and the magnet is provided on an outer wall of the magnetic holder.

11. The magnet arrangement structure according to claim 10, wherein the coil holder is further nested in an upper positioning holder coaxial with the magnet holder, and the bottom of the magnet holder is provided with a lower positioning holder in fit with the upper positioning holder.

12. The magnet arrangement structure according to claim 10, wherein the coil holder and the coil are located on the fixed stator in the voice coil motor, the magnet holder and the magnet are located on the movable rotor in the voice coil motor, and the stator is connected to the rotor through a spring or a ball.

13. A magnet arrangement structure suitable for a voice coil motor, comprising a magnet holder and a coil holder coaxial with the magnet holder, wherein 2n magnet groups are provided on the magnet holder, n is a natural number and is greater than or equal to 1, each magnet group is symmetrically provided around a central axis of the magnet holder, each magnet group comprises at least one magnet, and each magnet has two magnetic poles; surfaces, facing the central axis, of each magnet group comprise two different magnetic poles, and each magnetic pole is opposite to the magnetic pole of an adjacent magnet group; and each magnet group also corresponds to a coil, and the coil is installed on the coil holder;

wherein eight magnet groups are further provided in the magnet holder, the eight magnet groups respectively correspond to eight coils, and the eight magnet groups are provided with 45-degree rotation symmetry around the central axis.

* * * * *